United States Patent
Ruschke et al.

(10) Patent No.: US 6,450,722 B1
(45) Date of Patent: Sep. 17, 2002

(54) SEMISOLID PRODUCT DISPENSING HEAD

(75) Inventors: Rick R. Ruschke, Woodstock, IL (US); Brian J. Franzene, Lake Geneva, WI (US); Edward Kandel, McHenry, IL (US)

(73) Assignee: Filtertek Inc., Hebron, IL (US)

( * ) Notice: Subject to any disclaimer, the term of this patent is extended or adjusted under 35 U.S.C. 154(b) by 0 days.

(21) Appl. No.: 09/609,628

(22) Filed: Jul. 3, 2000

Related U.S. Application Data

(60) Provisional application No. 60/142,176, filed on Jul. 1, 1999.

(51) Int. Cl.[7] ............................................. B05C 11/00
(52) U.S. Cl. ........................ 401/266; 401/265; 401/261; 264/231; 264/320
(58) Field of Search .................................. 401/266, 265, 401/264, 261, 263, 55, 68, 205, 196; 428/32, 37; 264/231, 319, 320, 324, 321, 275

(56) References Cited

U.S. PATENT DOCUMENTS

| | | |
|---|---|---|
| 138,102 A | 4/1873 | Shaler |
| 740,367 A * | 9/1903 | Knight ........................ 264/324 |
| 1,024,591 A | 4/1912 | Michels |

(List continued on next page.)

FOREIGN PATENT DOCUMENTS

| | | |
|---|---|---|
| DE | 16 29 146 A | 1/1971 |
| DE | 3927955 | 2/1991 |
| EP | 0 258 799 | 3/1988 |
| FR | 2 489 118 | 3/1982 |
| GB | 2 067 128 | 7/1981 |
| WO | WO 95/23888 | 9/1995 |
| WO | WO 99/07611 | 2/1999 |
| WO | WO 00/19860 | 4/2000 |

OTHER PUBLICATIONS

Naltex, article from the Internet entitled "Naltex Netting Home", Oct. 3, 2000, <http://www.naltex.com/>, 4 pages.
Herrmann Ultrasonics, "Guide For Ultrasonic Plastic Welding", Version 1.0, (undated, but prior to Jul. 1, 1999) pp 13–26.
U.S. patent application No. 09/168,144 Filing Date: Oct. 7, 1998, priority document for PCT Application No. PCT/US99/23287.
U.S. patent application No. 09/407,441 Filing Date: Sep. 29, 1999, priority document for PCT Application No. PCT/US99/23287.

Primary Examiner—David J. Walczak
(74) Attorney, Agent, or Firm—Steven P. Shurtz; Brinks Hofer Gilson & Lione

(57) ABSTRACT

A method of making a head for a semisolid product dispenser, such as a gel deodorant dispenser, comprises the steps of: providing a piece of porous media having a desired shape with a perimeter and openings through the media in the area inside of the perimeter, compressing at least the portion of the media inside of the perimeter between two parts of a hard tool so as to crush the media, thereby reducing the size of the openings, and affixing the porous media to a head frame to form the semisolid product dispenser head. Preferably the porous media is affixed to the head frame by an insert injection molding process, and the media is crushed in the same mold tool as is used to mold the head frame. A preferred porous media is made of two layers of extruded strands of polymer, where the strands in one layer are generally parallel to one another but are non-parallel to the strands in the adjoining layer, the strands are bonded at crossover points between the layers and have openings defined by spaces between the strands in one layer superimposed over spaces between strands in the adjoining layer. Preferably the head of the semisolid product dispenser is made by ultrasonically welding the head frame to a transfer member using a combination of double shear and energy-directing ultrasonic weld joints, coupled with a positive stop.

68 Claims, 5 Drawing Sheets

U.S. PATENT DOCUMENTS

| | | | | |
|---|---|---|---|---|
| 2,564,860 | A | 8/1951 | Ryberg | |
| 2,712,170 | A | 7/1955 | Phillips | |
| 2,922,417 | A | 1/1960 | Bradley et al. | |
| 3,340,561 | A | 9/1967 | Schwartzman | |
| 3,706,393 | A | 12/1972 | Curtis et al. | |
| 3,933,557 | A | 1/1976 | Pall | |
| 4,353,956 | A | 10/1982 | Nalle, Jr. | |
| 4,399,184 | A | 8/1983 | Nalle, Jr. | |
| 4,567,011 | A | 1/1986 | Nalle, Jr. | |
| 4,608,166 | A | 8/1986 | Cain | |
| RE32,513 | E | 10/1987 | Seaber et al. | |
| 4,801,052 | A | 1/1989 | Citterio | |
| 4,809,912 | A | 3/1989 | Santini | |
| 5,000,356 | A | 3/1991 | Johnson et al. | |
| 5,018,894 | A * | 5/1991 | Goncalves | 401/205 |
| 5,186,775 | A | 2/1993 | Cullen et al. | |
| 5,288,350 | A | 2/1994 | Kita | |
| 5,299,877 | A | 4/1994 | Birden | |
| 5,372,285 | A | 12/1994 | Harrold et al. | |
| 5,538,022 | A | 7/1996 | Bennett | |
| 5,547,302 | A | 8/1996 | Dornbusch et al. | |
| 5,743,441 | A * | 4/1998 | Baudin et al. | 401/266 |
| 5,798,073 | A | 8/1998 | Johnson et al. | |
| D415,413 | S | 10/1999 | Cummings | |
| 5,997,202 | A | 12/1999 | Durocher | |
| 6,030,138 | A | 2/2000 | Losier | |
| D424,930 | S | 5/2000 | Crawford | |
| D426,770 | S | 6/2000 | Crawford | |
| 6,196,747 | B1 * | 3/2001 | Kreiseder et al. | 401/266 |
| D442,080 | S | 5/2001 | Crawford | |

* cited by examiner

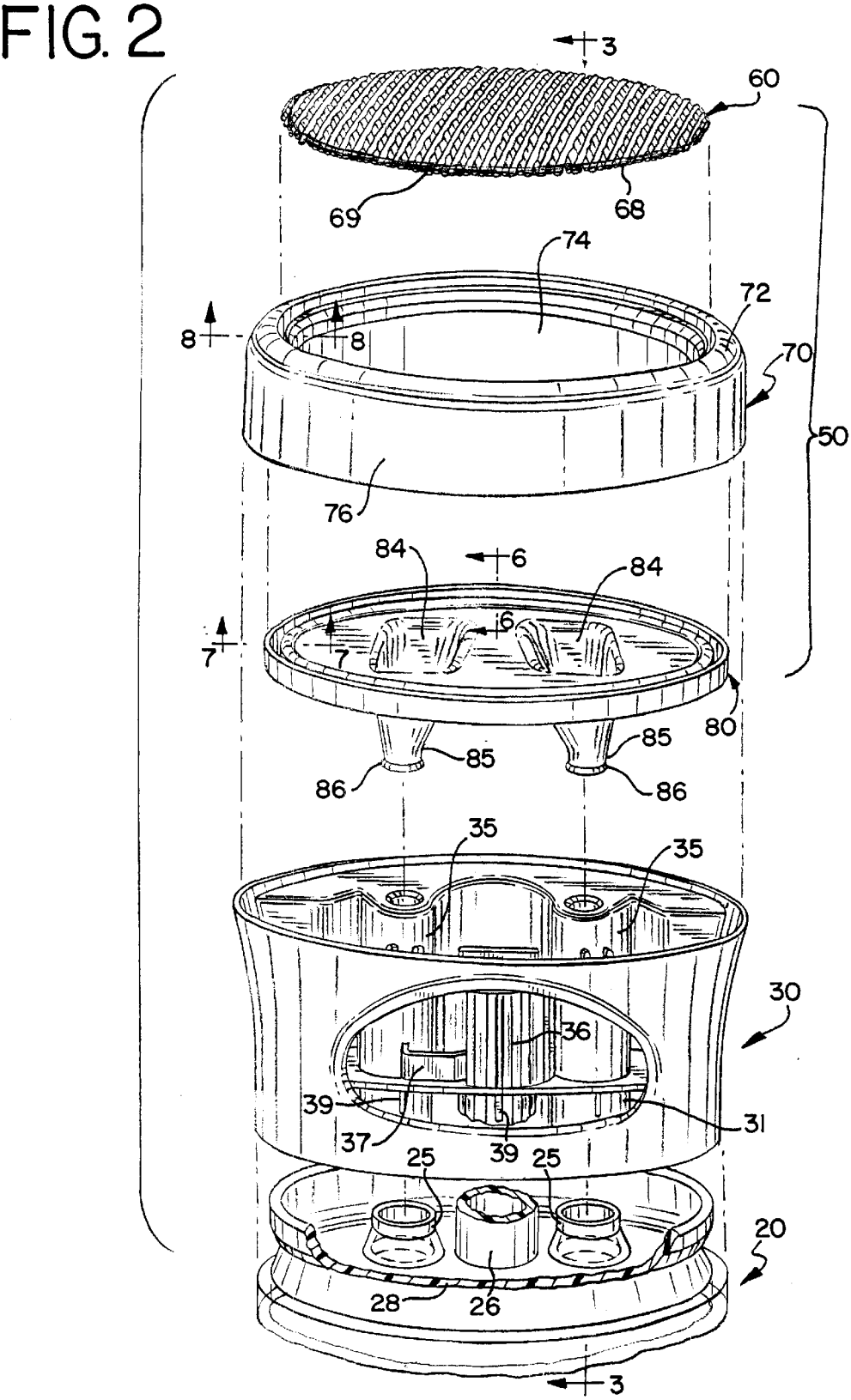

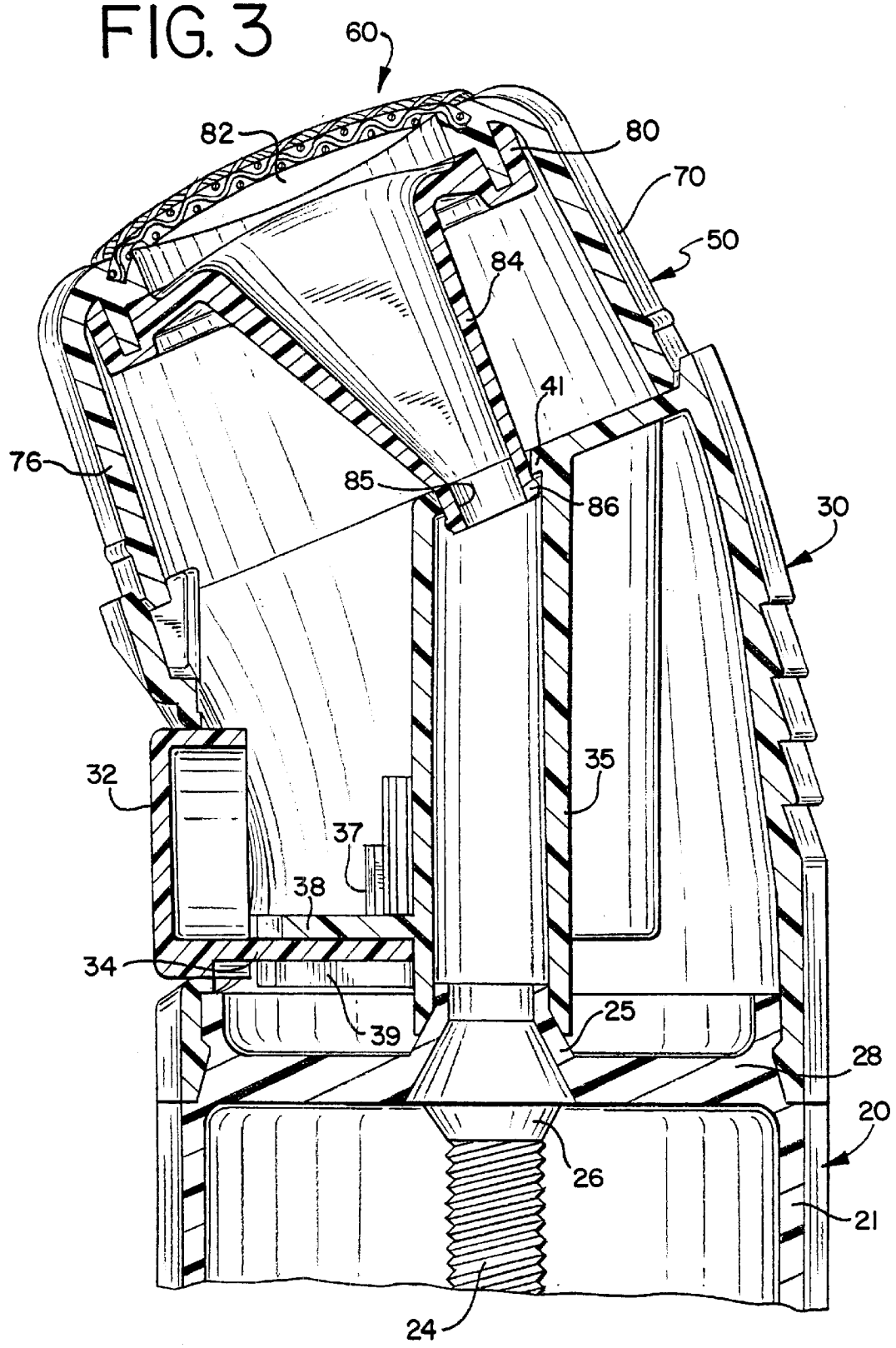

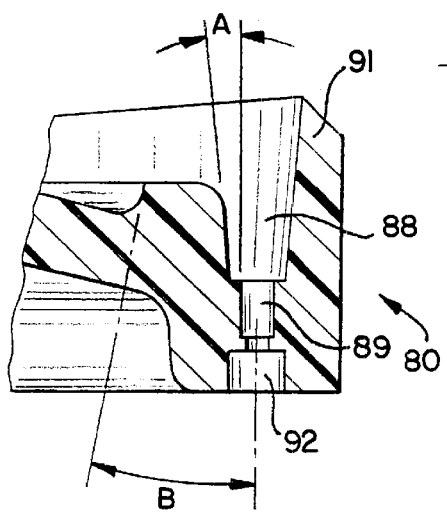
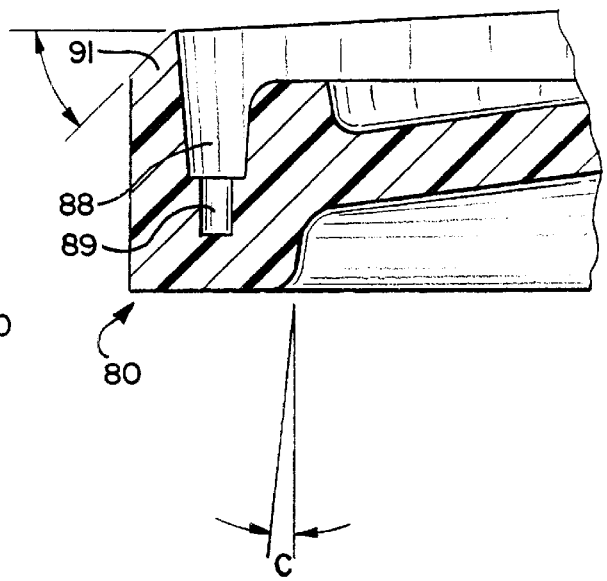
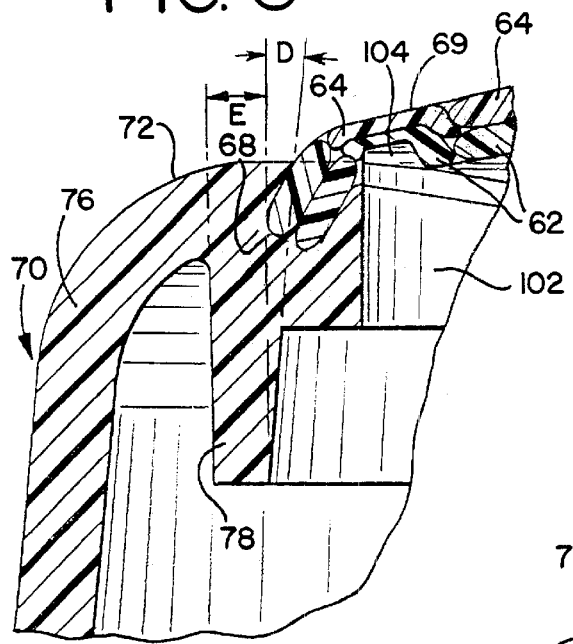
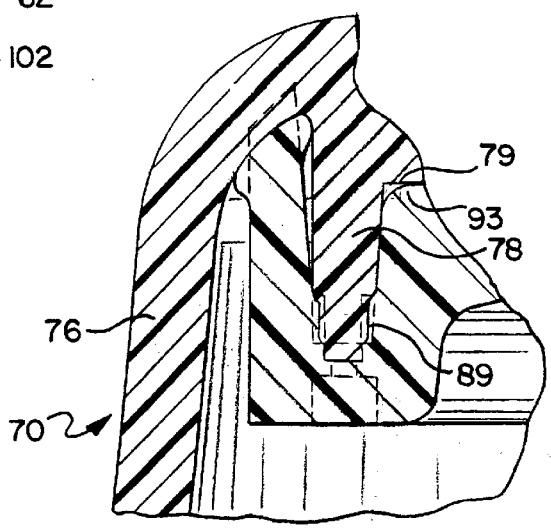

SEMISOLID PRODUCT DISPENSING HEAD

REFERENCE TO EARLIER FILED APPLICATION

The present application claims the benefit of the filing date under 35 U.S.C. § 119(e) of provisional U.S. patent application Ser. No. 60/142,176, filed Jul. 1, 1999, which is hereby incorporated by reference.

BACKGROUND OF THE INVENTION

The present invention relates primarily to a dispenser for gel deodorants or other semisolid products, and particularly to the head of a deodorant dispenser and methods of making the head and otherwise treating porous media so as to have properties desired in a semisolid product dispenser.

Deodorants and antiperspirants (hereinafter jointly referred to as deodorants) are typically applied to the skin of the underarm from some form of dispenser. Years ago aerosol cans were commonly employed to dispense deodorants. Deodorants in solid form have become popular. The solid deodorant is held in a body that has a piston. A cap is removed from the body, and the piston is activated to force the solid deodorant upwardly until the top portion is exposed. The top portion can then be rubbed onto the underarm skin.

Most recently, clear, gel deodorants have been proposed. Other semisolid forms of deodorant, such as creams or soft sticks, have also been suggested. One of the benefits of such semisolid deodorants is that they are less expensive to manufacture, because the fluid nature of the semisolid deodorant allows it to be pumped and easily loaded into a dispenser as part of the manufacturing step. One of the difficulties with dispensing a gel or other semisolid is that there must be a surface onto which the semisolid deodorant is applied, which is then brought into contact with the underarm. One prior art gel deodorant dispenser used a type of a grate. Gel was forced upwardly from within a body holding the gel through holes in the grate. The gel stayed on top of this grate and was then wiped onto the skin of the underarm. The grate was rigid, and was formed by injection molding plastic into a mold. The holes were formed by core pins within the mold.

Another proposal was to take a woven screen material and insert mold the woven screen material into a frame, thus forming a head. However, because the woven screen material was not rigid, it was proposed to include supports within the head to force the screen material to take on a dome shape so that it could contact the skin of the underarm. Several problems have been encountered with this proposal. First, the supports inherently block some of the openings in the screen, and the gel comes out unevenly across the screen. However, if no supports are used, and the screen collapses, all of the gel under the screen will come out, causing an overdose.

Second, the opening size of the screen plays conflicting roles. If the opening size is too large, the gel material will flow out if the dispenser is tipped on its side. On the other hand, if the opening size is too small, the gel material has to be put under such pressure when it is forced through the screen that the gel structure is compromised. For example, the liquid portion of the gel may disassociate from solid portions, or oil and water emulsions of other semisolid deodorants may break. In addition, when a semisolid deodorant is over pressurized, it continues to ooze out even though the user no longer activates the piston, and in fact may have set the dispenser aside after using it. When the user comes back, the deodorant has come through the screen and dried on top of the screen.

Another problem with woven screen material is that it is difficult to provide openings consistently sized any smaller than 400 square microns (20 microns by 20 microns) when making a weave. It is nearly impossible to make an opening smaller than 5 microns by 5 microns using a woven screen. If a media with an opening of 2 microns or less is desired, a porous membrane usually has to be used. Thus, if the semisolid deodorant material has a low viscosity, it may not be possible to make a normal woven screen with a pore size that will prevent the material from leaking out.

Another problem with the use of a woven screen is that the percent open area of a screen gets smaller and smaller as the pore size is reduced. The strands or fibers making the screen must be large enough to give integrity to the screen. As they are placed closer and closer to one another to reduce the pore size, the ratio of open area to area blocked by the fibers is reduced. The problem with a low percentage open area is that the amount of material that can be forced through the screen is reduced as the percent open area is decreased.

Another problem with a woven screen material is that if it is stretched while being manufactured as part of the dispensing head, especially around the edges when a rounded shape piece of media is used, the openings are not uniform. More deodorant could come out of the larger openings than the openings in the middle of the piece of media.

Besides the porous media itself, there are other difficulties in making a head for a semisolid product dispenser. Because the semisolid product is a gel or some other fluid material, all of the passageways between where it is stored and where it is dispensed must be fluid tight so that the product does not leak out under pressure. If parts of the dispenser are made out of an inexpensive thermoplastic material such as polypropylene, it is difficult to form leak-free joints between the parts, as polypropylene does not normally form strong bonds between parts. At times, ultrasonically welded parts only look like they are bonded because polypropylene is soft and the parts deform instead of welding together. Later, when under pressure, the parts come apart. Such a joint would be unacceptable in a semisolid product dispenser, as the dispenser head could come apart when the product was forced through it, causing the gel deodorant or other semisolid product to gush out and make a mess in the hands of the user as the joint came apart. Other thermoplastic materials could be used, but their cost would be a significant disadvantage where the dispenser is made in mass quantities and only used once before being thrown away.

SUMMARY OF THE INVENTION

The foregoing problems, as well as other difficulties encountered during development of a semisolid product dispenser head, have been overcome by the present invention. A porous material made from an extrusion of strands of polymer has been found which provides desired properties in making a head for a semisolid product dispenser. Also, it has been discovered that the opening size and shapes of the openings of a porous media can be improved for use in a semisolid product dispenser by crushing the media between two hard surfaces, such as parts of a mold tool. Further, an ultrasonic weld joint has been developed which can be used to securely join inexpensive polypropylene.

In a first aspect, the invention is a method of making a head for a semisolid product dispenser comprising the steps of providing a piece of porous media having a desired shape with a perimeter and openings through the media in the area inside of the perimeter; compressing at least the portion of the media inside of the perimeter between two parts of a hard tool so as to crush the media, thereby reducing the size of the openings; and affixing the porous media to a head frame to form the semisolid product dispenser head.

In a second aspect, the invention is the method of making a head for a semisolid product dispenser comprising the steps of providing a piece of porous media made of multiple layers of extruded strands wherein the strands are generally coplanar and parallel to one another within each layer and the strands in one layer are non-parallel to strands in an adjoining layer and bonded to the strands in the adjoining layer at crossover points between the strands; and insert molding the piece of porous media with a thermoplastic material into a head frame to thereby produce a head for a semisolid product dispenser.

In a third aspect, the invention is an improved porous media where the porous media has multiple layers of extruded strands of polymer with the strands in each layer being generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer, improved in that the average size of the openings through the media are reduced by crushing the strands of one layer against the strands of an adjoining layer, thereby flattening the strands and reducing the size of the spaces between the strands.

In a fourth aspect, the invention is an improved dispenser for dispensing a semisolid product where the dispenser includes a hollow body containing a semisolid product and a piston to force the semisolid product out of the hollow body through a porous media affixed to a head secured on the body, improved in that the porous media comprises multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer.

In a fifth aspect, the invention is a method of reducing the pore size of a porous media comprising the steps of providing a porous media comprising multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer; and compressing the media between two opposing hard surfaces so as to flatten the individual strands, thus making the strands wider in a direction perpendicular to the hard surfaces, thereby reducing the size of the openings between the strands.

In a sixth aspect, the invention is a method of making a semisolid product dispenser comprising the steps of providing a head frame with a top end and a sidewall depending from the top end; providing a body member that mates with the head frame, defining a deodorant holding and distribution space between the top end and the body member; providing mating ultrasonic weld joint surfaces on the head frame and the body member that provide a weld joint and a positive stop; and ultrasonically welding the body member and head frame together.

In a seventh aspect, the invention is a semisolid product dispenser comprising a head frame having a top end and a sidewall depending from the top end, the top end having a porous media attached thereto; a body member having an outer wall inside of the sidewall, the head top end and body member having a semisolid product holding and distribution space between them; and the body member outer wall being ultrasonically welded to the head frame to provide a leak-free joint so that all semisolid product in said body member may be forced out of said holding and distribution space through the porous media.

In an eighth aspect, the invention is a method of reducing the pore size of a porous media comprising the steps of providing a porous media having a first average thickness with openings therethrough creating a first average pore size; and compressing the media between opposing surfaces on a core and a cavity of a mold tool so as to reduce the average thickness of the media and to reduce the size of the openings through the media to create a second average pore size smaller than the first average pore size.

In a ninth aspect, the invention is a method of making a head for a semisolid deodorant dispenser comprising the steps of providing a piece of generally flat porous media having a perimeter; forming the porous media into a dome shape; and attaching the perimeter to a head frame having a central opening therethrough such that the dome shape of the media is retained, the media and the dome shape formed being rigid enough such that even though the media is supported only by its edges, the dome does not collapse when the head is pressed against underarm skin with normal user force sufficient to spread deodorant forced through the media across the skin.

In a tenth aspect, the invention is a deodorant dispenser comprising a body holding a semisolid deodorant and a dispensing head, the dispensing head having a frame with a central opening therethrough and a porous media shaped in the form of a dome convex of the rest of the head, the media having a perimeter which is attached to the head frame, the dome extending over the central opening, and the media being sufficiently rigid when in the dome shape such that the dome does not collapse when the head is pressed against underarm skin with normal user force sufficient to spread semisolid deodorant forced through the media across the skin.

BRIEF DESCRIPTION OF SEVERAL VIEWS OF THE DRAWINGS

FIG. 2 is an exploded view of the top portion of the semisolid product dispenser of FIG. 1 using an extruded media.

FIG. 3 is a cross-sectional view of the top portion of the semisolid product dispenser taken along line 3—3 of FIG. 2, except that a woven media is depicted.

FIG. 6 is a cross-sectional view of the semisolid product transfer member taken along line 6—6 of FIG. 2, showing a vent.

FIG. 7 is a cross-sectional view of the semisolid product transfer member taken along line 7—7 of FIG. 2.

FIG. 8 is a cross-sectional view of the head frame with a porous media insert molded therein, taken along line 8—8 of FIG. 2.

FIG. 9 is a cross-sectional view of the head frame of FIG. 8 welded to semisolid product transfer member of FIG. 7.

DETAILED DESCRIPTION OF THE DRAWINGS AND PREFERRED EMBODIMENTS OF THE INVENTION

Figure 1:
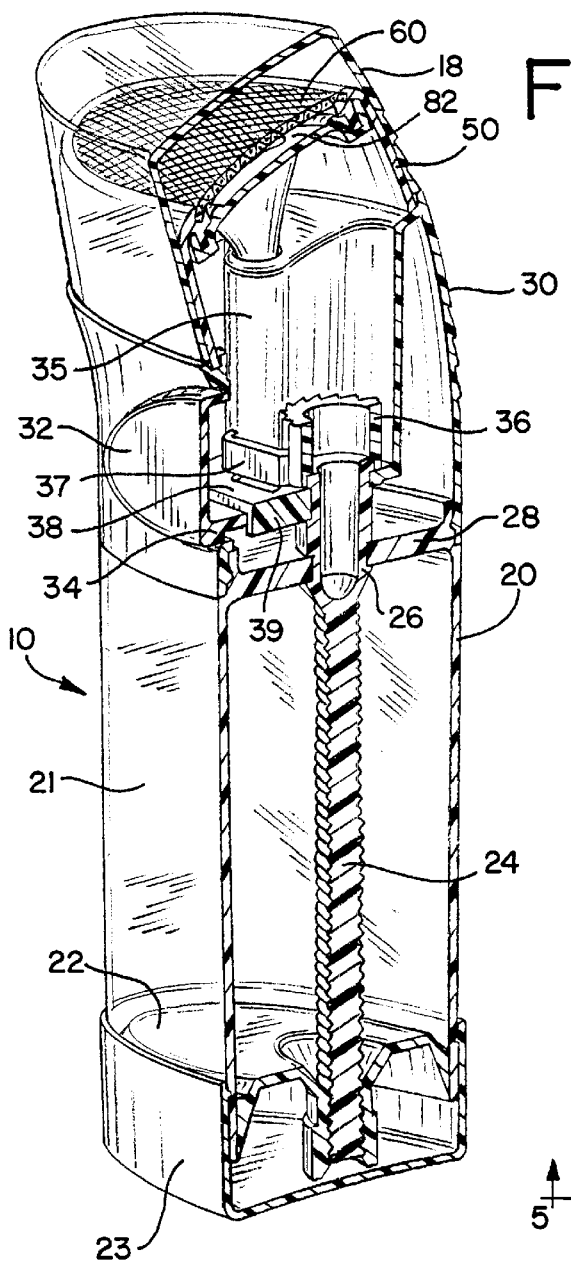
FIG. 1 is a cross-sectional perspective view of a preferred semisolid product dispenser incorporating aspects of the present invention using a woven media.

The present invention will be described in terms of a dispenser for a gel deodorant because the currently preferred semisolid product dispenser is designed for a gel deodorant. However, it should be understood that the invention is applicable to other semisolid products, such as cream or soft-stick deodorants. Further, some aspects of the invention have utility in other products beside deodorant dispensers, such as shaving cream, insect repellant, medicinal agents and other compositions applied to the skin.

A preferred embodiment of the gel deodorant dispenser 10 of the present invention is shown in FIGS. 1–9. The dispenser 10 is made of three main sections, a body 20, a neck 30 and a dispensing head assembly 50. A cap 18 is usually included to cover the head assembly 50 when not in use.

The body 20 and neck 30 were developed by others. The details of their construction are not important except to the extent that the head 50 cooperates with the body 20 and neck 30. However, as best understood by the present inventors, the preferred body 20 and neck 30 of the gel deodorant dispenser 10 are shown in FIGS. 1 and 2.

The body 20 is made with a base 23 and upstanding walls 21, and is hollow so that it can house the gel deodorant material. A piston 22 is mounted on screw 24 so that as screw 24 is turned, the piston 22 rides up inside of walls 21, forcing gel inside the body upward. The top of body 20 is closed by lid 28 except for two gel ports 25 (FIG. 2). The top 26 of screw 24 is journaled in another opening through lid 28.

The neck 30 includes two gel transfer tubes 35 that mate with gel ports 25 when the neck 30 is attached to body 20. Also, neck 30 includes a structure for turning screw 24, in this case a ratchet 36 and pawl 37. In the embodiment depicted, the neck 30 has a window 31 (FIG. 2) in which a push button 32 (FIG. 1) is mounted. Button 32 is connected by a slide arm 34 to activate ratchet 36 mounted on the top of screw 24. (The button 32 and slide arm 34 are not shown in FIG. 2 for sake of clarity.) Guides 39 molded on the bottom of shelf 38 cooperate to guide the slide arm 34. In addition to the openings for the gel transfer tubes 35, the shelf 38 has two holes, a round hole where the top 26 of screw 24 comes up, and a rectangular hole under a pawl 37 so that the pawl 37 is free to flex as ratchet 36 is rotated forward. The pawl 37 prevents the ratchet 36 from turning backwards after having been activated by the slide arm 34. In this way, as button 32 is pushed, ratchet 36 and screw 24 rotate, causing piston 22 to raise, forcing gel deodorant out of the hollow body 20, through gel ports 25 and gel transfer tubes 35 to the head assembly. The sidewalls of the neck 30, the gel transfer tubes 35, the shelf 38, the guides 39 and the pawl 37 are all molded as one piece.

As best shown in FIG. 2, head assembly 50 is made of three main parts, a porous media 60, a head frame 70 and a gel transfer body member 80. The porous media 60 generally starts out as a flat piece of material that is die-cut from a larger piece and then insert molded as the head frame 70 is injection molded. The gel transfer member 80 is molded separately, and then the head frame 70 and gel transfer member 80 are welded together, as explained in more detail below.

Figure 5:
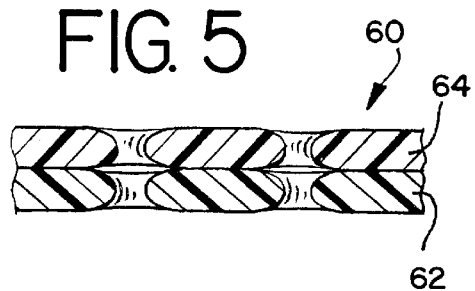
FIG. 5 is a cross-sectional view of the porous media taken along line 5—5 of FIG. 4.
Figure 4:
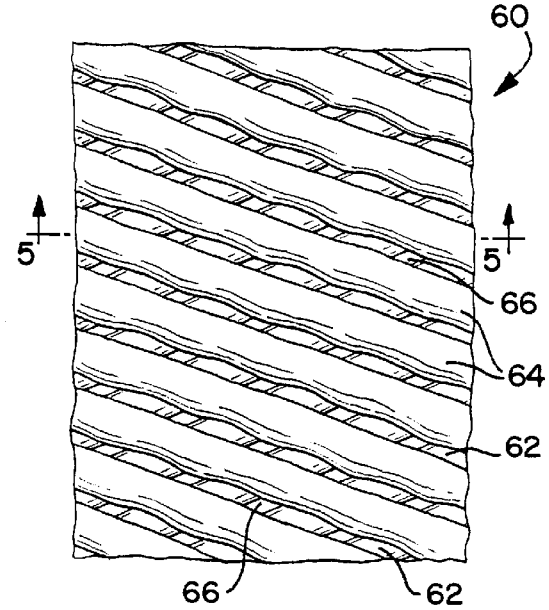
FIG. 4 is a plan view of the preferred extruded, porous media used in the semisolid product dispenser of FIG. 2.

The porous media could be a woven screen (as shown in FIGS. 1 and 3), but more preferably the porous media is a material supplied by Nalle Plastics Inc. of Austin, Tex. (shown in FIGS. 2, 4 and 5), under the tradename of Naltex, and is preferably modified as described below. The Naltex material is made from at least two layers of extruded strands. The strands in each layer are generally coplanar and parallel to one another, as shown in FIGS. 4 and 5. The strands 62 in one layer are non-parallel to the strands 64 in an adjoining layer. The strands are bonded to the strands in the adjoining layer at crossover points between the strands.

One of the benefits of the Naltex material is that the surface is textured. The strands produce a ribbed effect on the surface. This ribbed effect helps to evenly spread a deodorant or other material as it is applied to the skin. It also prevents clogging that would be more likely to occur if the surface were smooth.

The media 60 has openings 66 (FIG. 4) defined by spaces between the strands 62 in one layer that are superimposed over spaces between the strands 64 in the adjoining layer. The preferred material has the strands 62 in one layer oriented at an angle of between about 20° and 90° compared to the strand 64 of the adjoining layer. The preferred Naltex material is flattened as shown in FIG. 5 so that strands 62 and 64 are flattened, thus reducing the size of the openings 66, but still leaving a textured or ribbed surface. Since it is difficult to extrude a material with a small pore size, this step of crushing the media provides an innovative method of obtaining an inexpensive media with a desired small pore size for use in making a gel deodorant dispenser head assembly.

The head frame 70 is preferably molded from thermoplastic material, such as polypropylene. The head frame 70 has a top end 72 with a central opening 74 therethrough. Sidewalls 76 depending from the top end 72 extend around the entire perimeter of the head frame 70. An internal ridge 78 (FIG. 8) is formed on the inside of the frame member, just inside from the central opening 74. This ridge 78 is used in an ultrasonic welding process, described below.

After the porous media 60 has been cut into an oval shape, it is loaded into an injection mold tool that is used to form the head frame 70. As shown in FIG. 8, the core 102 of the tool has a lip 104 around the perimeter of the center portion of the core. This lip 104 is used to create a band 69 (FIG. 2) around the perimeter 68 of the porous media where all the openings 66 are closed off. This band 69 is the result of the lip crushing the strands 62 and 64 of the media so tightly that none of the hot thermoplastic material in the molding step can flow through the openings between the strands 62 and 64 in the area of the band 69. This prevents the hot plastic used to form the head frame from infiltrating into the central portion of the porous media and blocking the openings 66.

This band also serves another function in the finished product. As gel is forced through the media 60, it cannot flow through the area where the band 69 is formed. As a result, there is a visible demarcation between where gel is forced through the media 60 and where gel is not forced through the media. Preferably that line of demarcation is inside of the inner edge of the central opening 74.

Preferably, the perimeter 68 of the piece of media is bent inwardly (as shown in FIG. 8) by a ridge formed on the mold tool cavity. This results in a clean appearance as the edge of the porous media 60 is encapsulated or embedded in the plastic of the head frame, rather than "floating" near the surface where it could be seen, or worse yet, make for sharp protruding edges.

The closing of the mold tool 102 preferably not only creates band 69, but it also crushes the media so that the openings 66 are reduced in size. Hence, the gap between the core 102 and the cavity of the mold tool will be slightly less than the original thickness of the media 60. The mold tool 102 also forms the media 60 into a dome shape as the core 102 is convex and the cavity is concave. The dome shape is then maintained once the tool is opened because the media 60 is sufficiently rigid to maintain the dome shape when its edges are embedded in the head frame top end 72. The dome shape and the rigidness of the porous media 60 are preferably sufficient so that, even though the media is supported only at its edges, the dome does not collapse when the head 50 is pressed against underarm skin with normal user force sufficient to spread gel forced through the media across the skin. This rigidity thus prevents "overdosing."

If the gel deodorant is found to come through the porous media at a faster rate in the area where the gel transfer tubes terminate than in other parts of the media, the mold tool can be modified to cause greater crushing of the media in the areas where flow needs to be retarded. The greater crushing causes the openings 66 in those areas to be smaller, thus retarding the flow. Either the core pin or the mold tool, or both, can be modified to reduce the gap between them in the areas where the gel transfer tubes empty out. This preferably produces a graduated size for the openings with respect to their position on the surface of the head, with a region having a smaller average pore size than the average pore size outside of the region. However, the amount of gel that comes through is preferably uniform across the surface of the head 50, except that no gel comes through the area inside of band 69.

The gel transfer body member 80 has outer walls that mate with the head frame 70, inside the sidewalls 76, defining a deodorant holding and distribution space 82 (FIG. 3) between the top end 72 of the head frame, the porous media 60 and the gel transfer member 80. The gel transfer member 80 also has two funnel-shaped members 84 that terminate in rounded ends 85 that fit in the top of gel transfer tubes 35. As seen in FIG. 3, the top of each gel transfer tube 35 preferably has an internal rim 41 that coacts with an external rib 86 on each of the ends 85 to form a snap fit, holding the head assembly 50 onto the neck 30 once the parts are assembled.

The gel transfer member 80 has a groove 88 (FIGS. 6 and 7) which is used to form the ultrasonic weld. It also has an energy-directing point 91 which is used in the weld. Two vents 92 are located at the bottom of the groove 88, directly opposite from one another on the sides of the gel transfer member. One of these vents 92 is shown in FIG. 6. The other vent is not shown. These vents allow any gas trapped in the groove 88 when the weld is made to escape out from between the parts.

The ridge 78 acts as a tongue and cooperates with groove 88 to form a tongue-and-groove joint, best seen in FIG. 9. This joint is a double shear joint, as the ridge 78 is wider at its bottom than the bottom 89 of groove 88. Meanwhile, energy-directing point 91 melts into the underside of top end 72. Thus, when the parts are welded together, there are two types of welds made.

In addition, the weld design incorporates a positive stop. A positive stop surface 93 on the gel transfer member 80 contacts a positive stop surface 79 on the head frame when the weld has progressed to a sufficient depth. By designing in a positive stop, the welding operation can be carried out for longer lengths of time without fear of destroying the pieces. Thus, a more solid and leak-free joint can be formed, even when polypropylene is used for the head frame 70 and gel transfer member 80. Then, during use, these parts will not come apart, even when the gel is under pressure and the head is rubbed against underarm skin. Rather, all of the gel transferred to the gel transfer member 80 is forced out of the deodorant holding and distribution space 82 through the porous media 60.

The Naltex material is preferably crushed in the mold tool. However, it would also be possible to put a sheet of Naltex material through calender rolls and crush the strands prior to cutting the porous media into a desired shape. One of the benefits of using the mold tool for the crushing operation is that the crushing can be done in the same step as the insert molding, and areas of reduced size openings can be made in the correct position with respect to the gel transfer tubes.

The crushing step usually reduces the thickness of the material to between about 20% and about 90% of its original thickness. The media preferably has a first average thickness of between about 0.01 and about 0.1 inches, most preferably about 0.05 inches. This preferred media is crushed to a second average thickness of between about 0.035 and about 0.04 inches. In the area of band 69 the preferred material is crushed to a thickness of about 0.02 inches. The compression step normally changes the shape of the openings. More importantly, it usually changes the size of the openings. The average opening size of the media in the area inside of the perimeter formed by band 69 will preferably be reduced by at least 10%, and more preferably by at least 30%, and even as much as 50% by crushing. A preferred material may have an average opening size greater than 30,000 square microns before crushing, and after being crushed will have an average opening size of less than 30,000 square microns. For a gel deodorant dispenser, preferably the opening size of the crushed media will be less than 40,000 square microns. More preferably, the average opening size will be between about 900 and about 30,000 square microns. Of course the desired opening size will depend on the viscosity and other properties of the deodorant. For some deodorant materials a preferred opening size after crushing would be less than 10,000 square microns, such as a 60 micron square opening. The open area may be reduced from about 20–30% to about 5% by the crushing operation.

Figure 10:
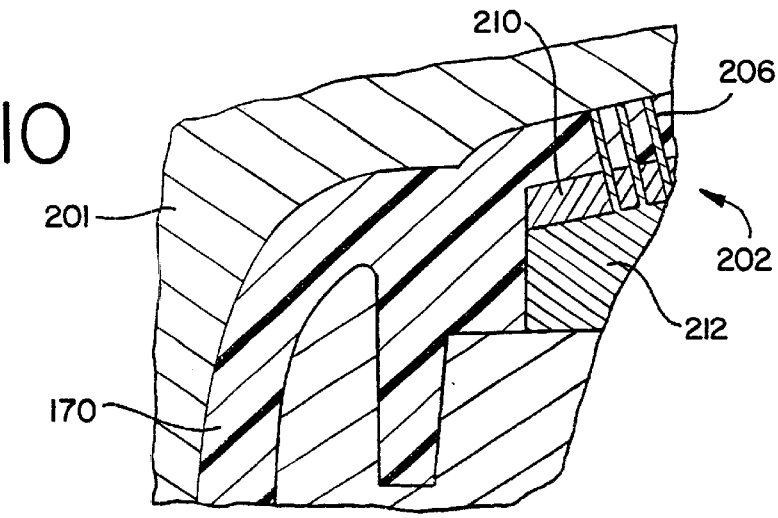
FIG. 10 is a cross-sectional view of a mold tool used to make an alternative embodiment of a semisolid product dispenser head.
Figure 10A:
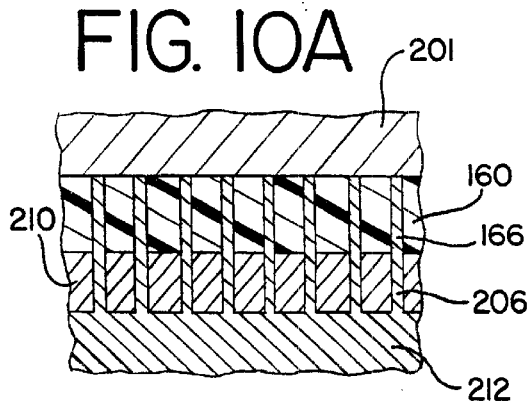
FIGS. 10A, 10B and 10C are each cross-sectional views of a part of the mold tool of FIG. 10 in different operating positions.
Figure 10B:
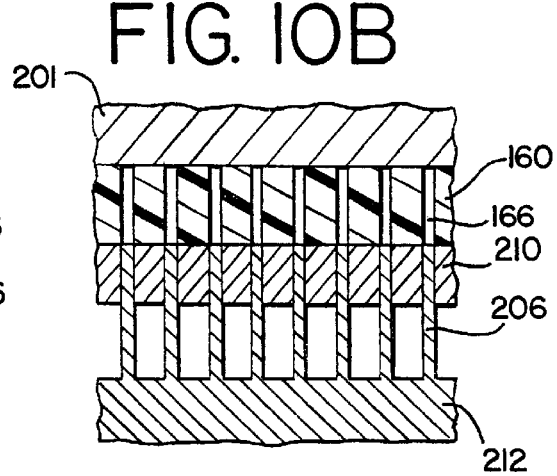
Figure 10C:
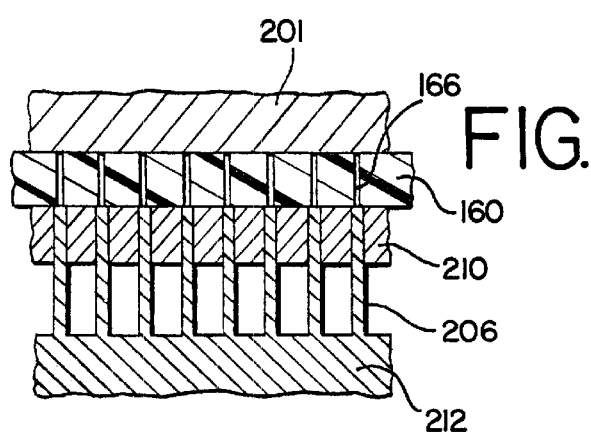

FIGS. 10, 10A, 10B and 10C depict another embodiment of the invention. In this embodiment, the porous media is formed as part of the injection molding of the head frame 170, which is comparable to the head frame 70 in FIGS. 1–9. The mold tool 202 for forming the head frame 170 includes multitudes of small core pins 206 which are initially extended to abut the cavity tool 201. As the head frame 170 is formed, the porous media 160 is also formed as part of the injection mold, and openings 166 in the porous media 160 result from the core pins 206. After the first stage of the process (FIG. 10A), while the mold tool is still closed, the pins 206, attached to plate 212, are withdrawn (FIG. 10B). At this point, the mold tool front 210 is then closed more tightly against the mold cavity 201 (FIG. 10C). This results in the porous media 160 being crushed between the two hard mold tool parts 201 and 210, which causes the holes 166 through the media 160 to become smaller. As a result, it is possible to make holes 166 in an injected molded media 160 smaller than the size of the core pins 206. This is significant because there are practical limits on the size of core pins 206. Therefore, if smaller holes 166 are desired in the media 160, they can be formed in a crushing operation. Just as with crushing the porous media 60, this crushing can take place in the same mold tool as is used to injection mold the head frame 170.

The preferred Naltex material is extruded using two layers of strands, with about 33, and preferably about 36 strands per inch in each layer. This type of material may be ordered from Nalle Plastics as Naltex S 1970. It has a thickness of about 0.051 inches and openings of about 200 microns square (40,000 square microns). After being crushed the openings are about 170 microns by 150 microns (25,500 square microns).

The use of a crushing step to reduce pore size would also be applicable to porous media made from weaving, casting, needle punching, water jets and laser drilling, as well as extrusion and injection molding described above. The media from Naltex is made from polypropylene. However, the media could be made of other polymers such as polyethylene, nylon, polyester or combinations thereof. Polypropylene is preferred because it is inexpensive and easily crushed.

Preferably, the percent open area of the porous media will be between about 1% and about 50%, and more preferably at least 2%. The band 69 where the openings have been completely closed is preferably about one-eighth inch wide. In the preferred embodiment, the angles shown in FIGS. 6–8 are A=5°, B=10°, C=5°, D=5° and E=1°. The energy directing point 91 preferably has a 45° slope on the point.

One of the benefits of using the positive stop surfaces 79 and 93 is that the position of the gel transfer member 80 with respect to the head frame 70 in the final head assembly 50 is very consistent. This results in the position of the external ribs 86 being precise with respect to the rest of the head assembly 50. Thus when the head 50 is snapped onto the neck 30, the ribs 86 catch under rims 41 to hold the neck and head securely.

Rather than affixing the porous media to the top end 72 of the head frame 70 by insert injection molding, the porous media could be welded onto the head frame by solvent welding, heat molding, ultrasonic welding or other methods of attachment.

It should be appreciated that the products, apparatus and methods of the present invention are capable of being incorporated in the form of a variety of embodiments, only a few of which have been illustrated and described above. The invention may be embodied in other forms without departing from its spirit or essential characteristics. For example, instead of molding the head frame and crushing the media in the same tool, those steps could be carried out in different tools. Instead of crushing the media to decrease its average pore size, other methods of reducing the pore size, such as the application of heat, could be used. Instead of using the body 20, neck 30 and gel transfer body member 80, the deodorant dispenser could simply have a hollow body with a piston inside, and the head frame 70 could be welded directly to that body.

The described embodiments are to be considered in all respects only as illustrative and not restrictive, and the scope of the invention is, therefore, indicated by the appended claims rather than by the foregoing description. All changes that come within the meaning and range of equivalency of the claims are to be embraced within their scope.

What is claimed is:

1. A method of making a head for a semisolid product dispenser comprising the steps of:
   a) providing a piece of porous media having a desired shape with a perimeter and openings through the media in the area inside of the perimeter;
   b) compressing at least the portion of the media inside of the perimeter between two parts of a hard tool so as to crush the media, thereby reducing the size of said openings; and
   c) affixing the porous media to a head frame to form the semisolid product dispenser head.

2. The method of claim 1 wherein the step of affixing the porous media comprises insert molding the media as the head frame is molded.

3. The method of claim 2 wherein the porous media is compressed at a band around the perimeter to such an extent that the openings are closed off such that hot plastic from the insert molding step will not flow through the band.

4. The method of claim 3 wherein the band is about ⅛-inch wide.

5. The method of claim 2 wherein the hard tool is a mold tool and the media is crushed between a core and an opposing cavity in the mold tool just prior to injection molding of the head frame in the same mold tool.

6. The method of claim 5 wherein the mold tool further comprises a ridge which folds the perimeter of the porous media inwardly so as to be encapsulated during the insert molding process.

7. The method of claim 1 wherein the step of compressing at least the portion of the porous media inside of the perimeter also changes the shape of the openings.

8. The method of claim 1 wherein the step of affixing the porous media comprises ultrasonic welding the porous media to the head frame.

9. The method of claim 1 wherein the step of affixing the porous media comprises heat molding the porous media to the head frame.

10. The method of claim 1 wherein the porous media comprises a woven screen.

11. The method of claim 1 wherein the porous media comprises multiple layers of extruded strands wherein the strands are generally coplanar and parallel to one another within each layer.

12. The method of claim 11 wherein the strands in one layer are non-parallel to strands in an adjoining layer and bonded to the strands in the adjoining layer at crossover points between the strands.

13. The method of claim 1 wherein inside the perimeter the porous media has a average opening size of greater than 30,000 square microns before being compressed and average opening size of less than 30,000 square microns after being compressed.

14. The method of claim 1 wherein the piece of porous media is provided by die cutting a sheet of media into oval shapes.

15. The method of claim 1 wherein the compressing step crushes the porous media from a first average thickness to a smaller second average thickness.

16. The method of claim 15 wherein the second average thickness is between about 20% and about 90% of the first average thickness.

17. The method of claim 15 wherein the first average thickness is between about 0.010 inches and about 0.1 inches.

18. The method of claim 15 wherein the first average thickness is about 0.05 inches and the second average thickness is between about 0.035 inches and about 0.04 inches.

19. The method of claim 1 wherein the piece of porous media is made of strands overlapping one another.

20. The method of claim 1 wherein the piece of porous media is provided by injection molding a thermoplastic into a bounded area with a plurality of spaced apart core pins within the area, the core pins being retracted after the injection molding to leave openings through the resulting media.

21. A method of making a head for a semisolid product dispenser comprising the steps of:
   a) providing a piece of porous media made of multiple layers of extruded strands wherein the strands are generally coplanar and parallel to one another within each layer and the strands in one layer are non-parallel to strands in an adjoining layer and bonded to the strands in the adjoining layer at crossover points between the strands; and
   b) insert molding the piece of porous media with a thermoplastic material into a head frame to thereby produce a head for a semisolid product dispenser.

22. In a porous media having multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer, the improvement comprising:
   a) the strands being flattened at the crossover points by crushing the strands of one layer against the strands of an adjoining layer thereby flattening the strands.

23. The improved porous media of claim 22 wherein the strands of one layer are at an angle of between about 20° and about 90° compared to the strands of the adjoining layer.

24. The improved porous media of claim 22 wherein the strands are made of polypropylene.

25. The improved porous media of claim 22 wherein the media has been cut into a shape with a perimeter and the strands in a band around the perimeter of the shape have been crushed sufficiently so as to block all openings through the media in the band.

26. The improved porous media of claim 22 wherein the media is crushed from a thickness of about 0.050 inches to a thickness of between about 0.035 inches and 0.04 inches.

27. The improved porous media of claim 22 having a percentage open area defined as the ratio of the combined area of all of the openings to the total area of the media and wherein the percentage open area is between about 1% and about 50%.

28. The improved porous media of claim 22 wherein the layers have about 33 to about 36 strands per inch.

29. The improved porous media of claim 22 wherein the average opening size is less than 30,000 square microns.

30. The improved porous media of claim 22 wherein the average opening size is between about 900 and about 30,000 square microns.

31. In a semisolid product dispenser including a hollow body containing a semisolid product and a piston to force the semisolid product out of the hollow body through a porous media affixed to a head secured on the body, the improvement comprising:
   a) the porous media comprising multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer.

32. The improved dispenser of claim 31 wherein the porous media is insert molded as part of the head.

33. The improved dispenser of claim 31 wherein the porous media is ultrasonically welded to a head frame.

34. The improved dispenser of claim 31 wherein the porous media is heat molded to a head frame.

35. The improved dispenser of claim 31 wherein the porous media is formed in a dome shape to contact an underarm area and is rigid enough that the dome shape will not collapse during normal use of the dispenser.

36. A method of reducing the pore size of a porous media comprising the steps of:
   a) providing a porous media comprising multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer; and
   b) compressing the media between two opposing hard surfaces so as to flatten the individual strands, thus making the strands wider in a direction perpendicular to the hard surfaces, thereby reducing the size of the openings between the strands.

37. The method of claim 36 wherein after the compressing step the porous media has an average opening size of less than 30,000 square microns and a percent open area greater than 2%.

38. The method of claim 36 wherein the porous material is made by extruding said strands.

39. The method of claim 36 wherein the strands are formed of polypropylene, polyethylene, nylon, polyester or combinations thereof.

40. A method of reducing the pore size of a porous media comprising the steps of:
   a) providing a porous media having a first average thickness with openings therethrough creating a first average pore size; and
   b) compressing the media between opposing surfaces on a core and a cavity of a mold tool so as to reduce the average thickness of the media and to reduce the size of the openings through the media to create a second average pore size smaller than the first average pore size.

41. The method of claim 40 wherein the openings in the porous media are made using a process selected from the group consisting of laser drilling, water jets, needle punching, injection molding, casting and weaving.

42. The method of making a head for a semisolid product dispenser of claim 21 wherein the piece of porous media is generally flat and has a perimeter, the head frame has a central opening there through, and the step of insert molding comprises:

i) forming the porous media into a dome shape; and ii) attaching the perimeter to the head frame such that the dome shape of the media is retained, the media and the dome shape formed being rigid enough such that even though the media is supported only by its edges, the dome does not collapse when the head is pressed against underarm skin with normal user force sufficient to spread semisolid deodorant forced through the media across the skin.

43. The method of claim 42 wherein the perimeter of the media is secured to the head frame by being insert molded into the head frame as the head frame is formed.

44. The method of claim 42 wherein openings through the porous media in a band around the perimeter are blocked such that flow of deodorant through the media only occurs in the area interior of said band.

45. The method of claim 44 wherein the band of blocked openings has an outer edge sealed to the head frame and an inner edge not sealed to the frame, such that as semisolid deodorant is forced through the media a user is able to see a demarcation between where the semisolid deodorant is forced through the media and semisolid deodorant cannot be forced through said blocked openings, that demarcation being inside of the edge of the central opening of the head frame.

46. The method of claim 42 wherein the media is formed into a dome shape between two halves of a mold tool, one half having a concave shape and the other half having a convex shape.

47. The method of claim 40 wherein the pore size of the media after the compressing step has a region where the average pore size is smaller than the average pore size outside of the region.

48. The improved dispenser of claim 31 wherein the stands form a textured surface that helps to evenly spread deodorant and prevent clogging.

49. The improved dispenser of claim 31 wherein the semisolid product comprises a deodorant material.

50. In a method of making porous media having multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer, the improvement comprising:

a) crushing the strands of one layer against the strands of an adjoining layer thereby flattening the strands and reducing the spaces between the strands and the average size of the openings through the media.

51. The improved method of claim 50 wherein the strands of one layer are at an angle of between about 20° and about 90° compared to the strands of the adjoining layer.

52. The improved method of claim 50 wherein the average size of the openings has been reduced by at least 10%.

53. The improved method of claim 50 wherein the average size of the openings has been reduced by at least 50%.

54. The improved method of claim 50 wherein the strands are made of polypropylene.

55. The improved method of claim 50 wherein the media has been cut into a shape with a perimeter and the strands in a band around the perimeter of the shape are crushed sufficiently so as to block all openings through the media in the band.

56. The improved method of claim 50 wherein the media is crushed from a thickness of about 0.050 inches to a thickness of between about 0.035 inches and 0.04 inches.

57. The improved method of claim 50 wherein the media has a percentage open area defined as the ratio of the combined area of all of the openings to the total area of the media and wherein the percentage open area is between about 1% and about 50%.

58. The improved method of claim 50 wherein the layers have about 33 to about 36 strands per inch.

59. The improved method of claim 50 wherein the average opening size is reduced to less than 30,000 square microns.

60. The improved method of claim 50 wherein the average opening size is reduced to between about 900 and about 30,000 square microns.

61. A method of reducing the pore size of a porous media comprising the steps of:

a) providing a porous media comprising multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer; and b) compressing the media between a core and a cavity of an injection mold tool so as to flatten the individual strands, thus making the strands wider in a direction perpendicular to the core and cavity surfaces, thereby reducing the size of the openings between the strands.

62. A method of reducing the pore size of a woven screen comprising the steps of:

a) providing a woven screen made of two sets of strands of polymer wherein the direction of the strands in the first set are non-parallel to the strands in the second set, the woven screen having openings through the woven screen defined by spaces between the strands in the first set superimposed over spaces between strands in the second set; and b) compressing the woven screen between two opposing hard surfaces so as to flatten the individual strands, thus making the strands wider in a direction perpendicular to the hard surfaces, thereby reducing the size of the openings between the strands.

63. In a porous media having multiple layers of extruded strands of polymer wherein the strands in each layer are generally coplanar and parallel to one another, the direction of the strands in one layer being non-parallel to the strands in an adjoining layer, the strands being bonded to the strands in the adjoining layer at crossover points between the strands, and the media having openings through the media defined by spaces between the strands in one layer superimposed over spaces between strands in the adjoining layer, the improvement comprising:

a) the media having been cut into a shape with a perimeter; the strands of one layer having been crushed against the strands of an adjoining layer in a band around the perimeter of the shape sufficiently so as to block all openings through the media in the band.

64. The method of claim 21 further comprising constructing the head into a semisolid product dispenser by:
  a) providing a body member that mates with the head frame;
  b) providing mating ultrasonic weld joint surfaces on the head frame and the body member that provide a weld joint and a positive stop; and
  c) ultrasonically welding the body member and head frame together.

65. The method of claim 64 wherein the weld joint comprises a double shear joint.

66. The method of claim 64 wherein the weld joint further comprise an energy-directing point.

67. The method of claim 64 wherein the weld joint comprises a tongue and groove weld joint with double shear welds and an energy-directing weld point.

68. The method of claim 64 wherein the weld joint comprises at least one vent to allow escape of air otherwise trapped between the weld joint surfaces.

* * * * *